United States Patent
Nakamoto et al.

(10) Patent No.: US 9,831,505 B2
(45) Date of Patent: Nov. 28, 2017

(54) POWER GENERATION SYSTEM AND METHOD FOR COOLING FUEL CELL EXHAUST IN POWER GENERATION SYSTEM

(71) Applicant: MITSUBISHI HITACHI POWER SYSTEMS, LTD., Kanagawa (JP)

(72) Inventors: Yukimasa Nakamoto, Tokyo (JP); Kazunori Fujita, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 206 days.

(21) Appl. No.: 14/440,452

(22) PCT Filed: Nov. 5, 2013

(86) PCT No.: PCT/JP2013/079945
§ 371 (c)(1),
(2) Date: May 4, 2015

(87) PCT Pub. No.: WO2014/073547
PCT Pub. Date: May 15, 2014

(65) Prior Publication Data
US 2015/0303496 A1    Oct. 22, 2015

(30) Foreign Application Priority Data
Nov. 9, 2012 (JP) .................. 2012-247119

(51) Int. Cl.
*H01M 8/04* (2016.01)
*H01M 8/04029* (2016.01)
(Continued)

(52) U.S. Cl.
CPC ..... *H01M 8/04029* (2013.01); *H01M 8/0432* (2013.01); *H01M 8/0435* (2013.01);
(Continued)

(58) Field of Classification Search
CPC ......... H01M 8/04029; H01M 8/04343; H01M 8/0435; H01M 8/0432; H01M 8/0441;
(Continued)

(56) References Cited

U.S. PATENT DOCUMENTS

2011/0053012 A1* 3/2011 Lee .................. H01M 8/04007
429/413

FOREIGN PATENT DOCUMENTS

| JP | 52-41418 | 10/1977 |
|---|---|---|
| JP | 5-82150 | 4/1993 |

(Continued)

OTHER PUBLICATIONS

Office Action dated May 17, 2016 in corresponding Japanese Application No. 2012-247119, with English translation.
Decision of a Patent Grant dated Dec. 20, 2016 in Japanese Application No. 2012-247119, with English translation.
Notification of Reason for Refusal dated Dec. 16, 2016 in Korean Application No. 10-2015-7011990, with English translation.
(Continued)

*Primary Examiner* — Muhammad S Siddiquee
(74) *Attorney, Agent, or Firm* — Wenderoth, Lind & Ponack, L.L.P.

(57) ABSTRACT

In order to protect the temperature of an exhaust stream in an exhaust line, even if the temperature of the exhaust stream discharged from a fuel cell exceeds a temperature during rated operation, a power generation system has: an SOFC; an exhaust air line or an exhaust fuel line, wherein the exhaust air line and exhaust fuel line carry exhaust air and exhaust fuel gas discharged from the SOFC, respectively; a temperature detector for detecting the temperature of the exhaust air or the exhaust fuel gas discharged from the SOFC or the temperature of the exhaust air line or the exhaust fuel line; an exhaust cooling device for cooling the exhaust air in the exhaust air line or the exhaust fuel gas in the exhaust fuel line; and a control device for activating the exhaust cooling device when the temperature detected by the temperature detector exceeds a predetermined temperature.

9 Claims, 8 Drawing Sheets

(51) Int. Cl.
*H01M 8/0432* (2016.01)
*H01M 8/0438* (2016.01)
*H01M 8/04701* (2016.01)
*H01M 8/04119* (2016.01)
*H01M 8/04007* (2016.01)
*H01M 8/04746* (2016.01)
*H01M 8/124* (2016.01)

(52) U.S. Cl.
CPC ..... *H01M 8/0441* (2013.01); *H01M 8/04156* (2013.01); *H01M 8/04343* (2013.01); *H01M 8/04402* (2013.01); *H01M 8/04716* (2013.01); *H01M 8/04007* (2013.01); *H01M 8/04164* (2013.01); *H01M 8/04753* (2013.01); *H01M 2008/1293* (2013.01)

(58) Field of Classification Search
CPC ......... H01M 8/04716; H01M 8/04156; H01M 8/04402; H01M 8/04007; H01M 8/04164; H01M 8/04753; H01M 2008/1293
See application file for complete search history.

(56) References Cited

FOREIGN PATENT DOCUMENTS

| | | |
|---|---|---|
| JP | 9-55220 | 2/1997 |
| JP | 2001-23679 | 1/2001 |
| JP | 2001-351656 | 12/2001 |
| JP | 2007-27055 | 2/2007 |
| JP | 2009-205930 | 9/2009 |
| JP | 2009-238391 | 10/2009 |
| JP | 2010-272342 | 12/2010 |
| JP | 2011-49131 | 3/2011 |
| JP | 2012-38688 | 2/2012 |
| KR | 10-2011-0021599 | 3/2011 |

OTHER PUBLICATIONS

Written Opinion of the International Searching Authority dated Feb. 10, 2014 in International (PCT) Application No. PCT/JP2013/079945.

International Search Report dated Feb. 10, 2014 in International (PCT) Application No. PCT/JP2013/079945.

\* cited by examiner

POWER GENERATION SYSTEM AND METHOD FOR COOLING FUEL CELL EXHAUST IN POWER GENERATION SYSTEM

TECHNICAL FIELD

The present invention relates to a power generation system combining a fuel cell, a gas turbine, and a steam turbine, and to a method of cooling fuel cell exhaust in a power generation system.

BACKGROUND ART

A solid oxide fuel cell ("SOFC") is known as high-efficiency fuel cell suitable for a wide range of uses. The SOFC is operated at elevated temperatures in order to increase ion conductivity, allowing air discharged from a compressor of a gas turbine to be used as air (oxidant) supplied to an air electrode side. The SOFC also allows high-temperature fuel that could not previously be utilized to be used as fuel for gas turbine combustors.

Thus, various power generation systems that combine an SOFC, gas turbines, and steam turbines to allow high-efficiency power generation to be achieved have been proposed, such as the system disclosed in Patent Document 1. The combined system disclosed in Patent Document 1 is provided with an SOFC, a gas turbine combustor for combusting exhaust fuel gas and exhaust air discharged from the SOFC, and a gas turbine comprising a compressor that compresses air and supplies the air to the SOFC.

CITATION LIST

Patent Document

Patent Document 1: Japanese Unexamined Patent Application Publication No. 2009-205930A

SUMMARY OF THE INVENTION

Technical Problem

In the conventional power generation system described above, the exhaust (exhaust air or exhaust fuel gas) discharged from the SOFC is at an elevated temperature; during rated operation, the exhaust air reaches, for example, 600° C., and the exhaust fuel gas reaches 450° C. If there is a change in the operating state of the SOFC, the exhaust temperature may conceivably exceed the temperature during rated operation. For this reason, the exhaust air line (pipe) used to carry exhaust air to the gas turbine combustor and the exhaust fuel line (pipe) used to carry exhaust fuel gas to the gas turbine combustor must be designed with materials and thicknesses capable of withstanding projected temperatures exceeding temperature during rated operation. However, it is difficult to foresee how high such projected temperatures might climb, making it impossible to settle upon a design. Moreover, even if the projected temperatures could be foreseen, pipe materials capable of withstanding these projected temperatures may be extremely expensive, or such materials may lead to extremely thick pipes, creating the problem of mounting manufacturing costs.

The present invention solves the problems described above, and has an object of providing a power generation system and a method of cooling fuel cell exhaust in a power generation system that allow for the protection of exhaust lines (pipes) for carrying exhaust even when the temperature of exhaust discharged from a fuel cell exceeds temperature during rated operation.

Solution to Problem

In order to achieve the object proposed above, the power generation system according to the present invention is characterized in comprising a fuel cell, an exhaust line for carrying exhaust discharged from the fuel cell, a temperature detector for detecting the temperature of exhaust discharged from the fuel cell or the temperature of the exhaust line, an exhaust cooling unit for cooling exhaust in the exhaust line, and a control unit for activating the exhaust cooling unit when the temperature detector detects a temperature exceeding a predetermined temperature.

The exhaust cooling device is thus activated when there is a change in the operating state of the fuel cell and the temperature of exhaust discharged from the fuel cell exceeds temperature during rated operation, thereby cooling the exhaust and allowing the exhaust temperature to be reduced. This allows elevated-temperature-induced failure of the exhaust-carrying exhaust line to be prevented. It is also possible to foresee the projected temperatures needed for the design of the exhaust line, and to set these projected temperatures to a temperature near that of the fuel cell during rated operation, allowing for a design that is safe and avoids increased manufacturing costs.

The power generation system of the present invention is characterized in that the exhaust cooling unit is provided with a coolant storage unit for storing coolant, a coolant supply line connecting the exhaust line and the coolant storage unit, a coolant on/off valve provided in the coolant supply line, and a coolant compressor, provided in the coolant supply line, for carrying coolant from the coolant storage unit to the exhaust line, and the control unit opens the coolant on/off valve and drives the coolant compressor when the temperature detected by the temperature detector exceeds a predetermined temperature.

The coolant on/off valve is thus opened and the coolant compressor is driven when there is a change in the operating state of the fuel cell and the temperature of the exhaust discharged from the fuel cell exceeds temperature during rated operation, thereby cooling the exhaust and allowing the temperature of the exhaust to be reduced.

The power generation system of the present invention is characterized in that water is stored in the coolant storage unit as coolant.

Water is thus supplied to the exhaust line as coolant when there is a change in the operating state of the fuel cell and the temperature of the exhaust discharged from the fuel cell exceeds temperature during rated operation. As a result, the water is vaporized by the high-temperature exhaust, allowing the exhaust temperature to be reduced.

The power generation system of the present invention is characterized in being provided with a water recovery unit for extracting and recovering water precipitating within the system, water recovered by the water recovery unit being stored in the coolant storage unit as coolant.

As a result, water precipitating within the system is extracted and stored in the coolant storage unit, allowing effective use to be made of water precipitating within the system as coolant.

The power generation system of the present invention is characterized in being provided with a pressure detector for detecting the pressure of the exhaust line, the control unit controlling the coolant compressor on the basis of the pressure detected by the pressure detector so that the pressure at which the coolant compressor carries coolant is greater than the pressure of the exhaust line.

Thus, when there is an increase in pressure due to an increase in the temperature of the exhaust discharged from the fuel cell, the pressure detector detects this pressure and increases the pressure at which the coolant compressor carries the coolant. This allows coolant to be reliably sent to the exhaust line, and the exhaust temperature to be reliably reduced.

The power generation system of the present invention is characterized in that the exhaust line is an exhaust air line for carrying exhaust air discharged from the fuel cell.

It is thus possible to cool exhaust air and reduce the temperature of the exhaust air when the temperature of the exhaust air discharged from the fuel cell exceeds temperature during rated operation. This allows elevated-temperature-induced failure of the exhaust-air-carrying exhaust air line to be prevented. It is also possible to foresee the projected temperatures needed for the design of the exhaust air line, and to set these projected temperatures to a temperature near that of the fuel cell during rated operation, allowing for a design that is safe and avoids increased manufacturing costs.

The power generation system of the present invention is characterized in that the exhaust line is an exhaust fuel line for carrying exhaust fuel gas discharged from the fuel cell.

It is thus possible to cool the exhaust fuel gas and reduce the temperature of the exhaust fuel gas when the temperature of the exhaust fuel gas discharged from the fuel cell exceeds temperature during rated operation. This allows high-temperature-induced failure of the exhaust-fuel-gas-carrying exhaust fuel line to be prevented. It is also possible to foresee the projected temperatures needed for the design of the exhaust fuel line, and to set these projected temperatures to a temperature near that of the fuel cell during rated operation, allowing for a design that is safe and avoids increased manufacturing costs.

A method of cooling fuel cell exhaust in the power generation system of the present invention is characterized in comprising the steps of carrying exhaust discharged from the fuel cell via the exhaust line, and cooling the exhaust in the exhaust line when the temperature of the exhaust discharged from the fuel cell exceeds a predetermined temperature.

The exhaust is thus cooled, reducing the temperature of the exhaust, when there is a change in the operating state of the fuel cell and the temperature of exhaust discharged from the fuel cell exceeds temperature during rated operation. This allows elevated-temperature-induced failure of the exhaust-carrying exhaust line to be prevented. It is also possible to foresee the projected temperatures needed for the design of the exhaust line, and to set these projected temperatures to a temperature near that of the fuel cell during rated operation, allowing for a design that is safe and avoids increased manufacturing costs.

Advantageous Effects of Invention

In accordance with the power generation system and the method of cooling fuel cell exhaust in a power generation system of the present invention, even if the temperature of exhaust discharged from a fuel cell exceeds temperature during rated operation, the exhaust-carrying exhaust line can be protected by cooling the exhaust.

DESCRIPTION OF EMBODIMENTS

Preferred embodiments of the power generation system and method of cooling fuel cell exhaust in a power generation system according to the present invention will now be described in detail with reference to the attached drawings. However, the present invention is not limited to these embodiments, and, in the case of multiple embodiments, combinations of different embodiments thereof are also encompassed within the scope of the invention.

EXAMPLES

The power generation system of the embodiment is a Triple Combined Cycle™ system that combines a solid oxide fuel cell ("SOFC"), a gas turbine, and a steam turbine. In this triple combined cycle system, an SOFC is disposed on an upstream side of a gas turbine combined cycle (GTCC) power generation system to allow for power generation via three stages—the SOFC, the gas turbine, and the steam turbine—thereby allowing an extremely high level of power generation efficiency to be achieved. The following description features a solid oxide fuel cell as the fuel cell of the present invention, but the present invention is not limited to fuel cell of this type.

Figure 1:
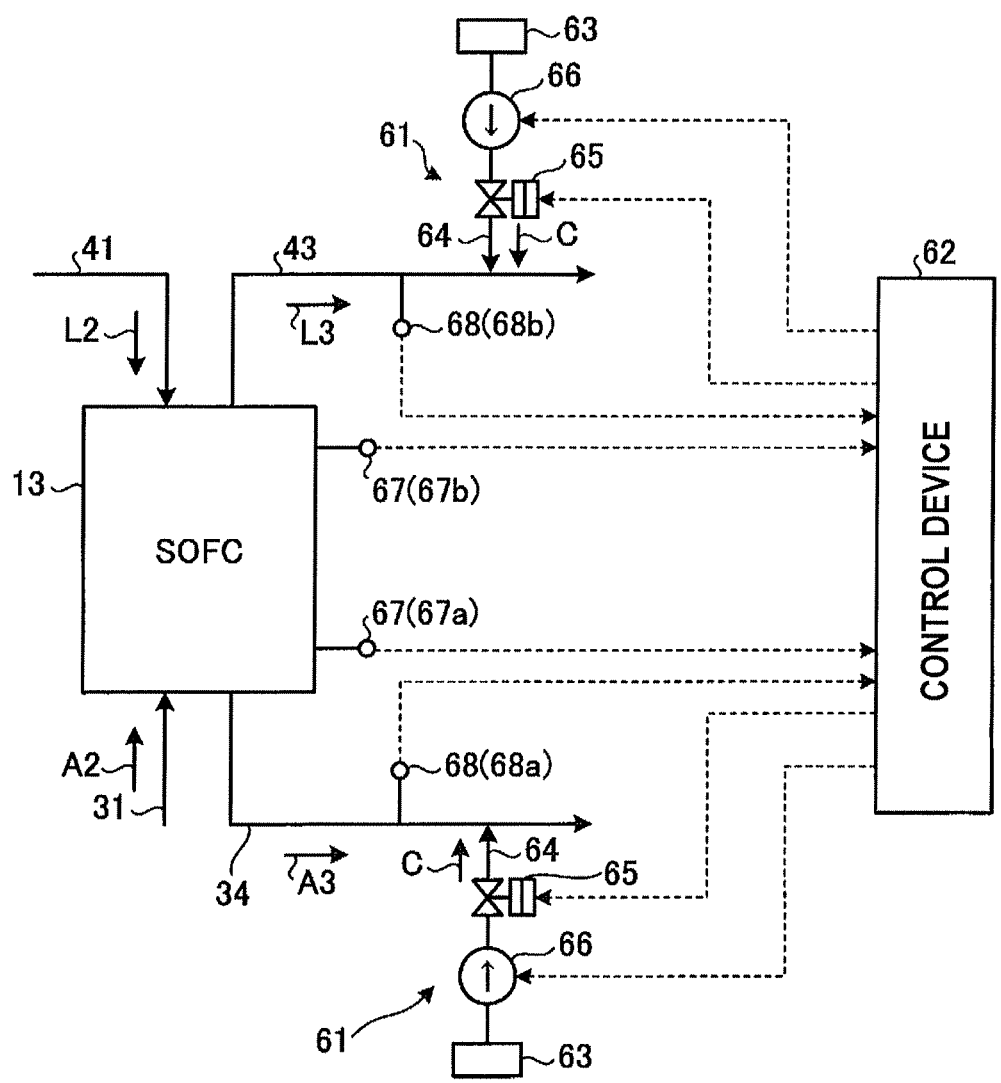
FIG. 1 is a schematic view illustrating a cooling device in a power generation system according to an embodiment of the present invention.
Figure 2:
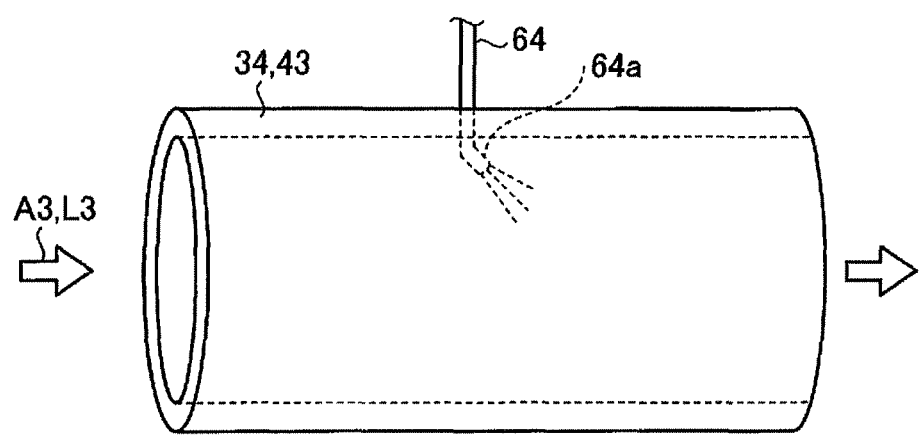
FIG. 2 is an illustration of the configuration of a part of a coolant supply unit of the cooling device in the power generation system of the embodiment.
Figure 3:
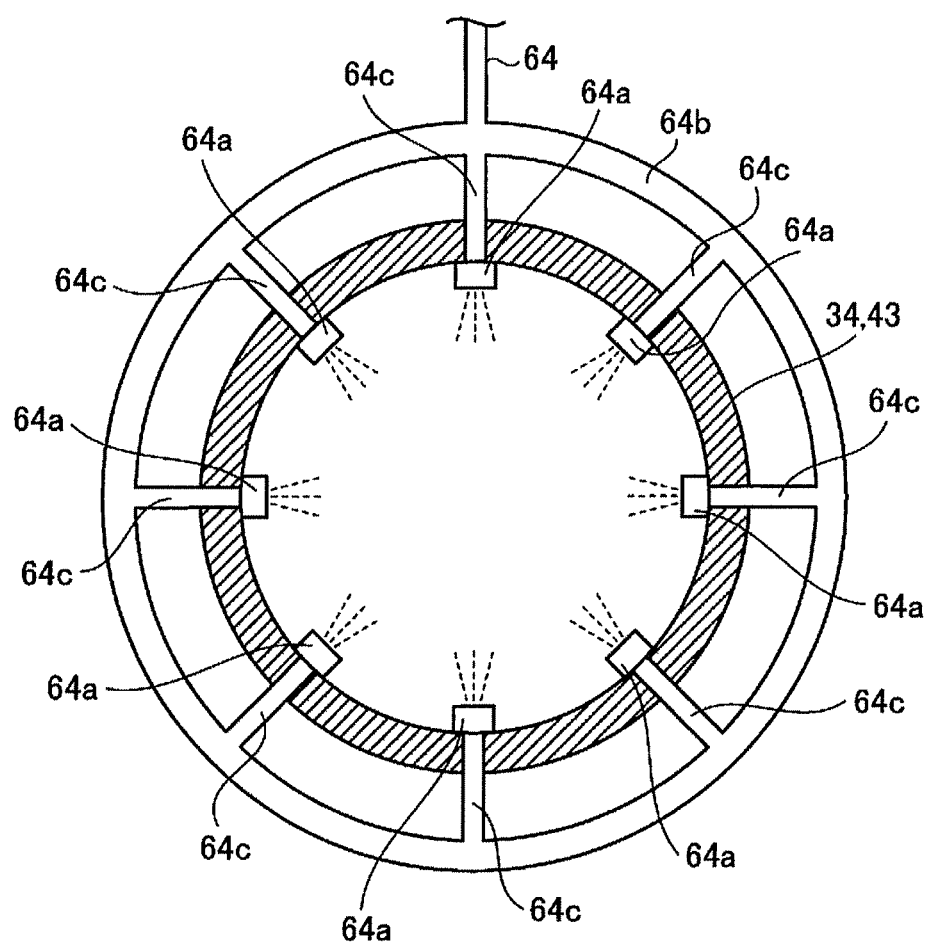
FIG. 3 is an illustration of the configuration of a part of the coolant supply unit of the cooling device in the power generation system of the embodiment.
Figure 4:
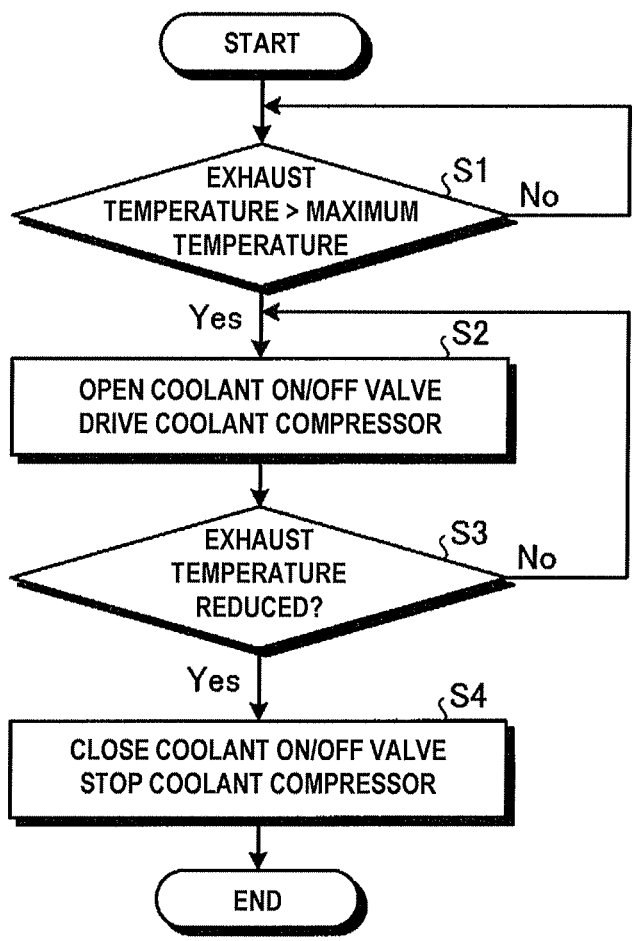
FIG. 4 is a flow chart of a process of cooling solid oxide fuel cell exhaust in the power generation system of the embodiment.
Figure 5:
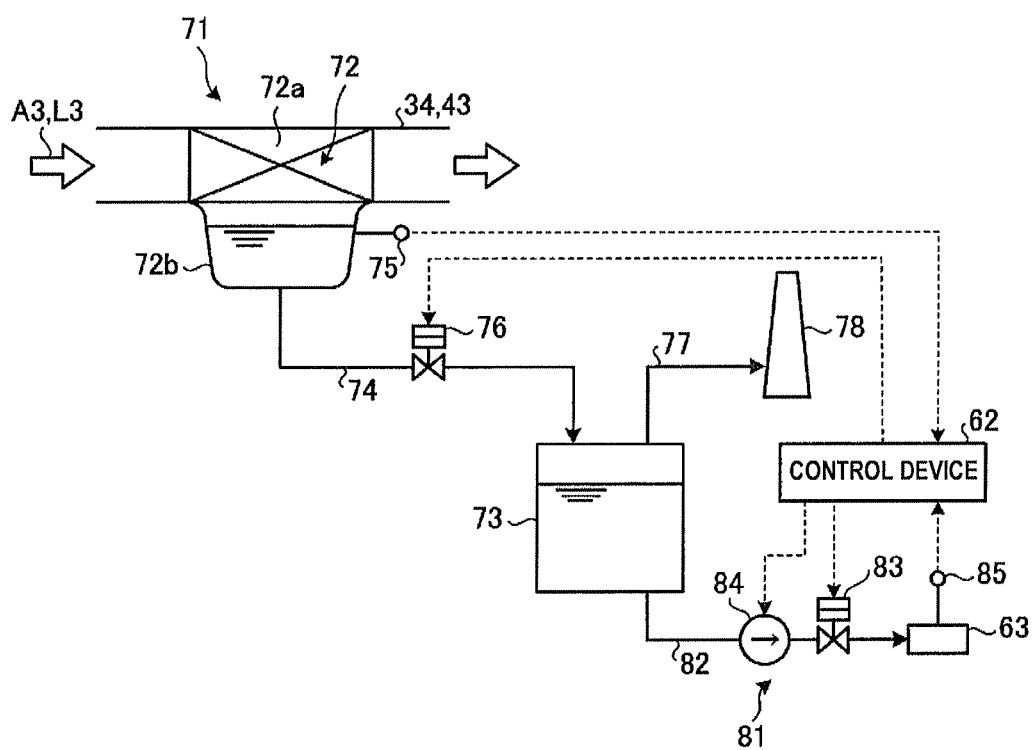
FIG. 5 is an illustration of the configuration of a part of a coolant supply unit of the cooling device in the power generation system of the embodiment.
Figure 6:
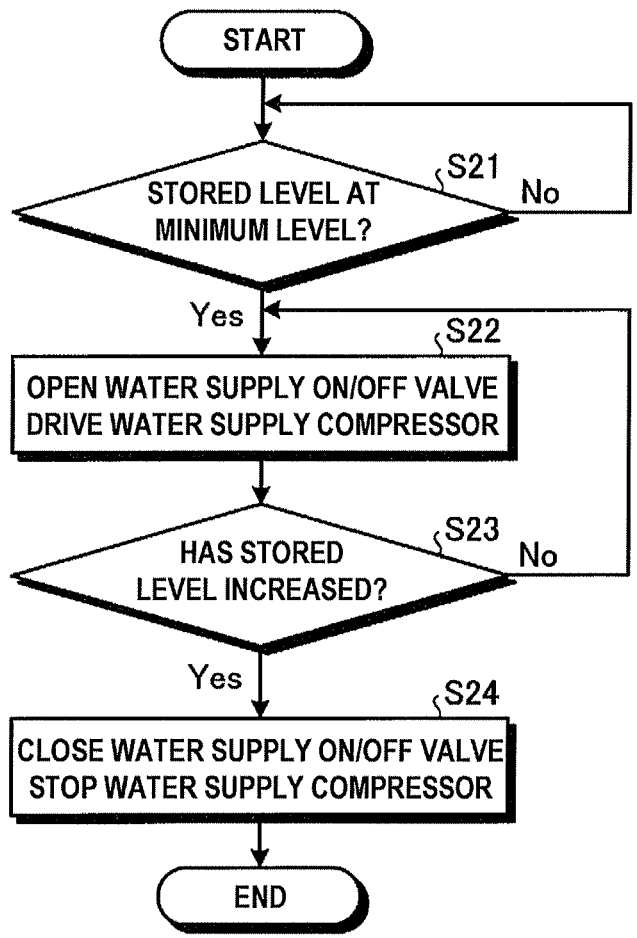
FIG. 6 is a flow chart of a process of replenishing coolant in the power generation system of the embodiment.
Figure 7:
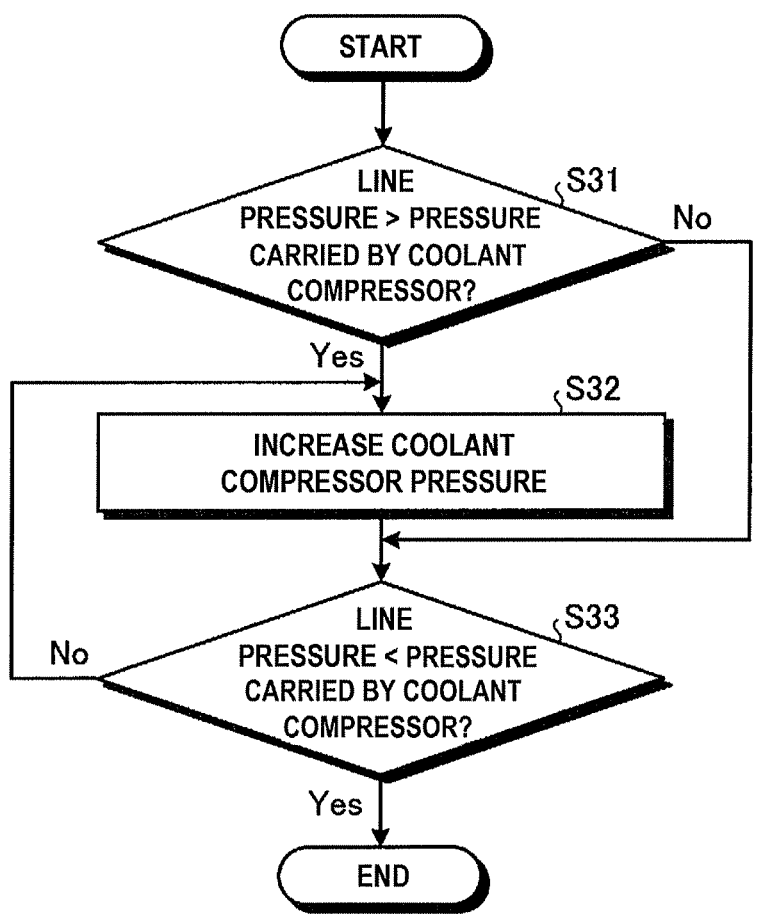
FIG. 7 is a flow chart of a process of supplying coolant in the power generation system of the embodiment.
Figure 8:
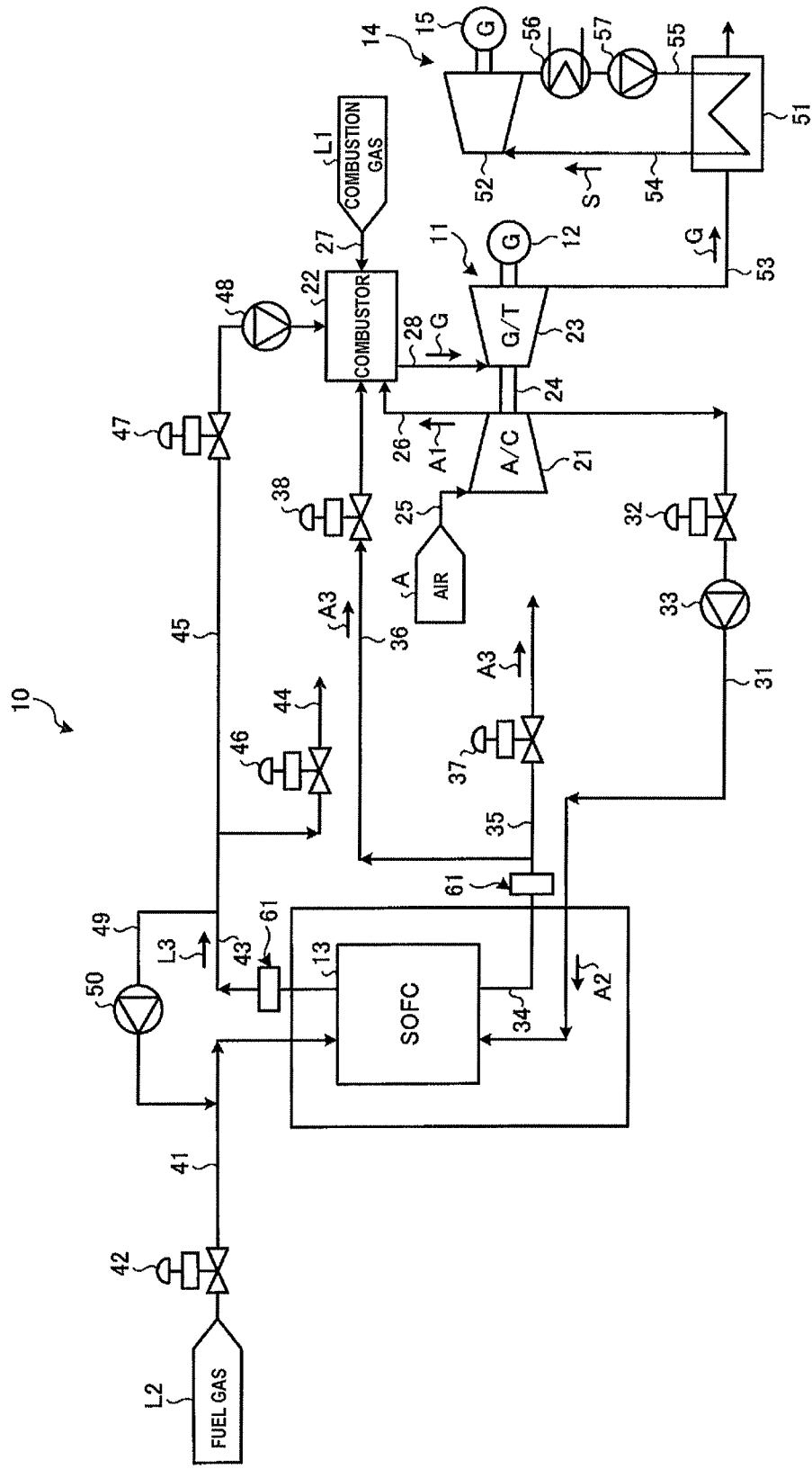
FIG. 8 is a schematic view of the configuration of the power generation system of the embodiment.

FIG. 1 is a schematic illustration of a cooling device for a power generation system according to an embodiment of the present invention. FIGS. 2, 3 and 5 are illustrations of the configuration of a part of a coolant supply unit of the cooling device for the power generation system according to the embodiment. FIG. 4 is a flow chart of a process of cooling SOFC exhaust in the power generation system of the embodiment. FIG. 6 is a flow chart of a process of replenishing coolant in the power generation system of the embodiment. FIG. 7 is a flow chart of a process of supplying coolant in the power generation system of the embodiment. FIG. 8 is a schematic view of the configuration of the power generation system of the embodiment.

As illustrated in FIG. 8, a power generation system 10 according to the embodiment comprises a gas turbine 11, a power generator 12, an SOFC 13, a steam turbine 14, and a power generator 15. The power generation system 10 combines power generation via the gas turbine 11, via the SOFC 13, and via the steam turbine 14 to yield a high level of power generation efficiency.

The gas turbine 11 comprises a compressor 21, a combustor 22, and a turbine 23, the compressor 21 and the turbine 23 being linked by a rotary shaft 24 so as to be capable of integral rotation. The compressor 21 compresses air A taken in via an air intake line 25. The combustor 22 mixes and combusts compressed air A1 supplied from the compressor 21 via a first compressed air supply line 26 and fuel gas L1 supplied via a first fuel gas supply line 27. The turbine 23 is rotated by exhaust gas (combustion gas) G supplied from the combustor 22 via an exhaust gas supply line 28. Although not illustrated in the drawings, the compressed air A1 compressed by the compressor 21 is supplied to the turbine 23 through the turbine casing, the compressed air A1 serving as cooling air for cooling the turbine blades and the like. The power generator 12 is provided on the same shaft as the turbine 23, and is capable of generating power through the rotation of the turbine 23. The fuel gas L1 supplied to the combustor 22 is, for example, liquefied natural gas (LNG).

The SOFC 13 is supplied with high-temperature fuel gas as a reductant and high-temperature air (oxidant gas) as an oxidant, which react at a predetermined operating temperature to generate power. The SOFC 13 is constituted by an air electrode, a solid electrolyte, and a fuel electrode housed within a pressurized container. Power is generated by supplying compressed air to the air electrode and supplying fuel gas to the fuel electrode. The fuel gas L2 supplied to the SOFC 13 is, for example, hydrocarbon gas such as liquefied natural gas (LNG), hydrogen ($H_2$) and carbon monoxide (CO), or methane ($CH_4$), or gas produced at gas production facilities from carbonaceous materials such as coal. The air used for the compressed air supplied to the SOFC 13 is an oxidant gas containing roughly 15-30% oxygen, with air being a typical advantageous example; apart from air, a gas mixture of combustion exhaust gas and air, a gas mixture of oxygen and air, or the like can also be used (hereinafter, the oxidant gas supplied to the SOFC 13 will be referred to as "air").

A second compressed air supply line (compressed air line) 31 branching from the first compressed air supply line 26 is linked to the SOFC 13, allowing some of the compressed air A2 compressed by the compressor 21 to be supplied to an inlet of the air electrode. The second compressed air supply line 31 is provided with a control valve 32 that is capable of adjusting the amount of supplied air and a blower 33 that is capable of increasing the pressure of the compressed air A2, the two being provided along an air flow direction. The control valve 32 is provided on an upstream side in the air flow direction of the second compressed air supply line 31, and the blower 33 is provided on a downstream side of the control valve 32. An exhaust air line 34 for discharging exhaust air A3 that has been used at the air electrode is linked to the SOFC 13. The exhaust air line 34 branches into an exhaust line 35 for externally discharging exhaust air A3 that has been used at the air electrode and a compressed air circulation line 36 linked to the combustor 22. The term "exhaust air line 34" also encompasses the exhaust line 35 and the compressed air circulation line 36. The exhaust line 35 is provided with a control valve 37 that is capable of adjusting the amount of discharged air, and the compressed air circulation line 36 is provided with a control valve 38 that is capable of adjusting the amount of circulated air.

The SOFC 13 is provided with a second fuel gas supply line 41 for supplying fuel gas L2 to an inlet of the fuel electrode. The second fuel gas supply line 41 is provided with a control valve 42 that is capable of adjusting the amount of fuel gas supplied. An exhaust fuel line 43 for discharging exhaust fuel gas L3 that has been used at the fuel electrode is linked to the SOFC 13. The exhaust fuel line 43 branches into an exhaust line 44 that discharges externally and an exhaust fuel gas supply line 45 linked to the combustor 22. The term "exhaust fuel line 43" also encompasses the exhaust line 44 and the exhaust fuel gas supply line 45. The exhaust line 44 is provided with a control valve 46 that is capable of adjusting the amount of discharged fuel gas. The exhaust fuel gas supply line 45 is provided with a control valve 47 that is capable of adjusting the amount of supplied fuel gas and a blower 48 that is capable of increasing the pressure of the fuel pressure, the two being provided along a fuel flow direction. The control valve 47 is provided on an upstream side with respect to the flow direction of the exhaust fuel gas L3 within the exhaust fuel gas supply line 45, and the blower 48 is provided on a downstream side of the control valve 47 in the flow direction of the exhaust fuel gas L3.

The SOFC 13 is provided with a fuel gas recirculation line 49 that links the exhaust fuel line 43 and the second fuel gas supply line 41. The fuel gas recirculation line 49 is provided with a recirculation blower 50 that recirculates exhaust fuel gas L3 from the exhaust fuel line 43 to the second fuel gas supply line 41.

A turbine 52 of the steam turbine 14 is rotated by steam produced by a heat recovery steam generator (HRSG) 51. An exhaust gas line 53 leading from the gas turbine 11 (turbine 23) is linked to the heat recovery steam generator 51, and steam S is produced through the exchange of heat between the air and the high-temperature exhaust gas G. A steam supply line 54 and a water supply line 55 are provided between the steam turbine 14 (turbine 52) and the heat recovery steam generator 51. The water supply line 55 is provided with a steam condenser 56 and a water supply pump 57. The power generator 15 is provided on the same shaft as the turbine 52, and is capable of generating power through the rotation of the turbine 52. Exhaust gas G whose heat has been recovered using the heat recovery steam generator 51 is purged of toxic substances and vented into the atmosphere.

The operation of the power generation system 10 according to the embodiment will now be described. When the power generation system 10 is activated, the gas turbine 11, steam turbine 14, and SOFC 13 are activated in that order.

First, in the gas turbine 11, the compressor 21 compresses the air A, the combustor 22 mixes and combusts the compressed air A1 and the fuel gas L1, and the turbine 23 is rotated by the exhaust gas G, causing the power generator 12 to begin generating power. Next, in the steam turbine 14, the turbine 52 is rotated by steam S produced by the heat recovery steam generator 51, causing the power generator 15 to begin generating power.

Next, in the SOFC 13, compressed air A2 is first supplied to begin increasing pressure, and heating is begun. With the control valve 37 of the exhaust line 35 and the control valve 38 of the compressed air circulation line 36 closed and the blower 33 of the second compressed air supply line 31 stopped, the control valve 32 is opened a predetermined amount. Some of the compressed air A2 compressed by the compressor 21 is then supplied from the second compressed air supply line 31 to the SOFC 13 side. As a result, the pressure in the SOFC 13 side is increased by the supplied compressed air A2.

Meanwhile, fuel gas L2 is supplied to the SOFC 13 to begin increasing pressure. With the control valve 46 of the exhaust line 44 and the control valve 47 of the exhaust fuel gas supply line 45 closed and the blower 48 stopped, the control valve 42 of the second fuel gas supply line 41 is opened, and the recirculation blower 50 of the fuel gas recirculation line 49 is driven. The fuel gas L2 is then supplied from the second fuel gas supply line 41 to the SOFC 13 side, and the exhaust fuel gas L3 is recirculated by the fuel gas recirculation line 49. As a result, the pressure in the SOFC 13 side is increased by the supplied fuel gas L2.

When the pressure on the air electrode side of the SOFC 13 reaches the outlet pressure of the compressor 21, the control valve 32 is fully opened, and the blower 33 is driven. Simultaneously, the control valve 37 is opened, and exhaust air A3 is discharged from the SOFC 13 via the exhaust line 35. The compressed air A2 is then further pressurized by the blower 33, then supplied to the SOFC 13 side. Simultaneously, the control valve 46 is opened, and exhaust fuel gas L3 is discharged from the SOFC 13 via the exhaust line 44. When the pressure on the air electrode and the fuel electrode sides of the SOFC 13 reaches a target pressure, the pressurization of the SOFC 13 is complete.

Subsequently, once the reaction (power generation) in the SOFC 13 stabilizes and the components of the exhaust air A3 and the exhaust fuel gas L3 stabilize, the control valve 37 is closed and the control valve 38 is opened. The exhaust air A3 from the SOFC 13 is then supplied to the combustor 22 via the compressed air circulation line 36. The control valve 46 is closed, while the control valve 47 is opened and the blower 48 is driven. The exhaust fuel gas L3 from the SOFC 13 is then supplied to the combustor 22 via the exhaust fuel gas supply line 45. At this time, the amount of fuel gas L1 supplied to the combustor 22 from the first fuel gas supply line 27 is reduced.

At this point, power is being generated in all three modes—by the power generator 12 through the driving of the gas turbine 11, by the SOFC 13, and by the power generator 15 through the driving of the steam turbine 14—and the power generation system 10 is in ordinary operation.

The exhaust (exhaust air A3 and exhaust fuel gas L3) discharged from the SOFC 13 is at an elevated temperature, with, for example, the exhaust air A3 reaching 600° C. and the exhaust fuel gas L3 reaching 450° C. during rated operation. If there is a change in the operating state of the SOFC 13, the exhaust temperature at that time may conceivably exceed the temperature during rated operation.

In the power generation system 10 according to the embodiment, as illustrated in FIG. 1, the exhaust air line 34 for carrying exhaust air discharged from the SOFC 13 and the exhaust fuel line 43 for carrying exhaust fuel gas L3 discharged from the SOFC 13 (the exhaust air line 34 and exhaust fuel line 43 will be collectively referred to as the "exhaust lines") are provided with an exhaust cooling device (exhaust cooling unit) 61 in order to reduce the temperature of the exhaust air A3 and the exhaust fuel gas L3 (the exhaust air A3 and the exhaust fuel gas L3 will be collectively referred to as "exhaust"), and a control device (control unit) 62 drives the exhaust cooling device 61 when the temperature of the exhaust discharged from the SOFC 13 exceeds a predetermined temperature.

The exhaust cooling device 61 provided in the exhaust air line 34 is provided in that part of the exhaust air line 34 immediately adjacent to the SOFC 13, and comprises a coolant storage unit 63, a coolant supply line 64, a coolant on/off valve 65, a coolant compressor 66, and a temperature detector 67 (67a). Similarly, the exhaust cooling device 61 provided in the exhaust fuel line 43 is provided in that part of the exhaust fuel line 43 immediately adjacent to the SOFC 13, and comprises a coolant storage unit 63, a coolant supply line 64, a coolant on/off valve 65, a coolant compressor 66 and a temperature detector 67 (67b). The exhaust cooling device 61 provided in the exhaust air line 34 and the exhaust cooling device 61 provided in the exhaust fuel line 43 are similarly configured; thus, the following description will focus on the exhaust cooling device 61 provided in the exhaust air line 34.

The coolant storage unit 63 is a container for storing coolant C. The coolant storage unit 63 may be shared by the exhaust cooling device 61 provided in the exhaust air line 34 and the exhaust cooling device 61 provided in the exhaust fuel line 43. Water is used as the coolant C, the water being stored in the coolant storage unit 63.

The coolant supply line 64 connects the exhaust line and the coolant storage unit 63. Specifically, the coolant supply line 64 connects the exhaust air line 34 and the coolant storage unit 63 in the exhaust cooling device 61 provided in the exhaust air line 34. Meanwhile, in the exhaust cooling device 61 provided in the exhaust fuel line 43, the coolant supply line 64 connects the exhaust fuel line 43 and the coolant storage unit 63. As illustrated in FIG. 2, the coolant supply line 64 is provided with a coolant spray nozzle 64a within the exhaust air line 34 or the exhaust fuel line 43. Only one coolant spray nozzle 64a is illustrated in FIG. 2, but the present invention is not limited to such an arrangement. For example, as illustrated in FIG. 3, the coolant supply line 64 may be connected to an annular line 64b surrounding the outside of the exhaust air line 34 or the exhaust fuel line 43, with a plurality of coolant spray nozzles 64a provided within the exhaust air line 34 or the exhaust fuel line 43 being connected to a plurality of branch lines 64c connected to the exhaust air line 34 or the exhaust fuel line 43 from the annular line 64b.

The coolant on/off valve 65 is provided in the coolant supply line 64, and opens and closes the coolant supply line 64.

The coolant compressor 66 is provided between the coolant storage unit 63 and the coolant on/off valve 65 on the coolant supply line 64, and carries coolant C from the coolant storage unit 63 to the exhaust air line 34.

The temperature detector 67 detects the temperature of the exhaust discharged from the SOFC 13. Specifically, in the exhaust cooling device 61 provided in the exhaust air line 34, the temperature detector 67a detects the temperature of the exhaust air A3 from the air electrode of the SOFC 13. The temperature detector 67a may be provided in that part of the exhaust air line 34 immediately adjacent to the SOFC 13 and detect the temperature of the exhaust air A3 carried to the exhaust air line 34. Alternatively, the temperature detector 67a may be provided in that part of the exhaust air line 34 immediately adjacent to the SOFC 13 and detect the temperature of the exhaust air line 34. Meanwhile, in the exhaust cooling device 61 provided in the exhaust fuel line 43, the temperature detector 67b detects the temperature of the exhaust fuel gas L3 from the fuel electrode of the SOFC 13. The temperature detector 67b may be provided in that part of the exhaust fuel line 43 immediately adjacent to the SOFC 13 and detect the temperature of the exhaust fuel gas L3 carried to the exhaust fuel line 43. Alternatively, the temperature detector 67b may be provided in that part of the exhaust fuel line 43 immediately adjacent to the SOFC 13 and detect the temperature of the exhaust fuel line 43.

A maximum temperature for the temperature of the exhaust air A3 or the exhaust fuel gas L3 (such as a predetermined temperature exceeding the temperature during rated operation of the SOFC 13) is pre-stored in the control device 62. When the exhaust temperature detected by the temperature detector 67 exceeds the maximum temperature, the control device 62 activates the exhaust cooling device 61.

Specifically, as shown in FIG. 4, during rated operation of the SOFC 13, if the exhaust temperature increases and the exhaust temperature detected by the temperature detector 67 exceeds the maximum temperature (step S1: Yes), the control device 62 opens the coolant on/off valve 65 and drives the coolant compressor 66 (step S2). Coolant C is then carried from the coolant storage unit 63 to the exhaust air line 34, and sprayed into the interior of the exhaust air line 34 or the exhaust fuel line 43 via the coolant spray nozzle 64a. If the exhaust temperature has not exceeded the maximum temperature (step S1: No), the control device 62 re-inputs and monitors the exhaust temperature detected by the temperature detector 67.

When the exhaust temperature detected by the temperature detector 67 falls below the maximum temperature (step S3: Yes), the control device 62 closes the coolant on/off valve 65 and stops the coolant compressor 66 (step S4), ends the control process, and returns to step S1 and re-inputs and monitors the exhaust temperature detected by the temperature detector 67. If the exhaust temperature does not fall (step S3: No), the control device 62 returns to step S2 and continues to open the coolant on/off valve 65 and drive the coolant compressor 66. For example, when the exhaust temperature detected by the temperature detector 67a exceeds the maximum temperature, the coolant C is sprayed from the coolant spray nozzle 64a provided in the exhaust line 34. When the exhaust temperature detected by the temperature detector 67a subsequently falls below the maximum temperature, spraying of the coolant C from the coolant spray nozzle 64a is stopped.

As described above, the power generation system 10 of the embodiment comprises the SOFC 13, the exhaust air line 34 and exhaust fuel line 43 for carrying the exhaust air A3 and the exhaust fuel gas L3 discharged from the SOFC 13, the temperature detectors 67 for detecting the temperature of the exhaust air A3 and the exhaust fuel gas L3 discharged from the SOFC 13 or the temperature of the exhaust air line 34 and the exhaust fuel line 43, the exhaust cooling devices 61 for cooling the exhaust air A3 and exhaust fuel gas L3 in the exhaust air line 34 and the exhaust fuel line 43, and the control device 62 for activating the exhaust cooling device 61 when the temperature detected by the temperature detectors 67 exceeds a predetermined temperature.

Thus, when there is a change in the operating state of the SOFC 13 and the temperature of the exhaust air A3 and exhaust fuel gas L3 discharged from the SOFC 13 exceeds the temperature during rated operation, the exhaust cooling devices 61 are activated, thereby cooling the exhaust air A3 and the exhaust fuel gas L3 and allowing the temperature of the exhaust air A3 and exhaust fuel gas L3 to be reduced. As a result, it is possible to prevent high-temperature-induced failure of the exhaust air line 34 and the exhaust fuel line 43 for carrying the exhaust air A3 and the exhaust fuel gas L3. It is also possible to foresee the projected temperatures needed for the design of the exhaust air line 34 and the exhaust fuel line 43, and to set these projected temperatures to a temperature near that of the SOFC 13 during rated operation, allowing for a design that is safe and avoids increased manufacturing costs.

A method of cooling fuel cell exhaust in the power generation system 10 of the embodiment comprises the steps of carrying the exhaust air A3 and the exhaust fuel gas L3 discharged from the SOFC 13 via the exhaust air line 34 and the exhaust fuel line 43, and cooling the exhaust air A3 and the exhaust fuel gas L3 in the exhaust air line 34 and the exhaust fuel line 43 when the temperature of the exhaust air A3 and the exhaust fuel gas L3 discharged from the SOFC 13 exceeds a predetermined temperature.

Thus, when there is a change in the operating state of the SOFC 13 and the temperature of the exhaust air A3 and exhaust fuel gas L3 discharged from the SOFC 13 exceeds the temperature during rated operation, the exhaust air A3 and the exhaust fuel gas L3 are cooled, allowing the temperature of the exhaust air A3 and exhaust fuel gas L3 to be reduced. As a result, it is possible to prevent high-temperature-induced failure of the exhaust air line 34 and the exhaust fuel line 43 for carrying the exhaust air A3 and the exhaust fuel gas L3. It is also possible to foresee the projected temperatures needed for the design of the exhaust air line 34 and the exhaust fuel line 43, and to set these projected temperatures to a temperature near that of the SOFC 13 during rated operation, allowing for a design that is safe and avoids increased manufacturing costs.

In the power generation system 10 of the embodiment, the exhaust cooling devices 61 are provided with a coolant storage unit 63 for storing coolant C, a coolant supply line 64 connecting the exhaust air line 34 or the exhaust fuel line 43 to the coolant storage unit 63, a coolant on/off valve 65 provided in the coolant supply line 64, and a coolant compressor 66, provided in the coolant supply line 64, for carrying coolant C from the coolant storage unit 63 to the exhaust air line 34 or the exhaust fuel line 43, and the control device 62 opens the coolant on/off valve 65 and drives the coolant compressor 66 when the temperature detected by the temperature detector 67 exceeds a predetermined temperature.

Thus, when there is a change in the operating state of the SOFC 13 and the temperature of the exhaust air A3 and exhaust fuel gas L3 discharged from the SOFC 13 exceeds the temperature during rated operation, the coolant on/off valves 65 are opened and the coolant compressors 66 are driven, thereby cooling the exhaust air A3 and the exhaust fuel gas L3 and allowing the temperature of the exhaust air A3 and exhaust fuel gas L3 to be reduced.

In the power generation system 10 of the embodiment, water is preferably stored in the coolant storage units 63 as coolant.

Thus, when there is a change in the operating state of the SOFC 13 and the temperature of the exhaust air A3 and the exhaust fuel gas L3 discharged from the SOFC 13 exceeds the temperature during rated operation, water is supplied to the exhaust air line 34 and the exhaust fuel line 43 as coolant C. As a result, the water contacts the high-temperature exhaust air A3 and exhaust fuel gas L3 and is vaporized, thereby allowing the temperature of the exhaust air A3 and the exhaust fuel gas L3 to be reduced.

In the exhaust cooling device 61 provided in the exhaust fuel line 43, apart from water, ethyl alcohol or methyl alcohol may be stored in the coolant storage unit 63 as coolant C. In this case, the ethyl alcohol or methyl alcohol is vaporized by the high-temperature exhaust fuel gas L3, allowing the temperature of the exhaust fuel gas L3 to be reduced. The vaporized ethyl alcohol or methyl alcohol is combusted by the combustor 22.

The power generation system 10 of the embodiment is provided with a water recovery device (water recovery unit) 71, as illustrated in FIG. 5. The water recovery device 71 extracts and recovers water precipitating within the system.

The water recovery device 71 can be provided, for example, in each of the lines 34, 35, 36, 43, 44, 45, and 49 of the power generation system 10. FIG. 5 illustrates a representative example in which the water recovery device 71 is provided in the exhaust air line 34 or exhaust fuel line 43. As described above, high-temperature exhaust air A3 or exhaust fuel gas L3 discharged from the SOFC 13 is carried to the exhaust air line 34 or exhaust fuel line 43. Thus, moisture contained in the exhaust air A3 or exhaust fuel gas L3 precipitates within the exhaust air line 34 or the exhaust fuel line 43 in the form of water droplets. If these water droplets flow into the combustor 22, problems may occur in the combustion performed by the combustor 22. Thus, the water recovery device 71 extracts and recovers this water.

As illustrated in FIG. 5, the water recovery device 71 comprises a water recovery mechanism 72, a water recovery container 73, a water recovery line 74, a stored level detector 75, and a water recovery on/off valve 76.

The water recovery mechanism 72 is provided, for example, at a low position within the exhaust air line 34 or the exhaust fuel line 43, and comprises a water recoverer 72a and a storage section 72b. The water recoverer 72a separates and recovers moisture contained in the exhaust air A3 or the exhaust fuel gas L3. Various types of water recoverer 72a are possible—for example, a mesh may be disposed within the exhaust air line 34 or the exhaust fuel line 43, moisture collecting on and being separated by the mesh; a plurality of corrugated plates may be disposed at spaced intervals within the exhaust air line 34 or the exhaust fuel line 43, moisture collecting on and being separated by the plates; a spiral flow may be formed within the exhaust air line 34 or the exhaust fuel line 43 to separate moisture via centrifugal force; or the exhaust air A3 or exhaust fuel gas L3 may pass through the upper part of the recoverer, with moisture pooling in the bottom part thereof. The storage section 72b is a downwardly sunken recessed section formed at a low position within the exhaust air line 34 or the exhaust fuel line 43. Moisture separated by the water recoverer 72a drips down into and pools in the storage section 72b.

The water recovery container 73 is a container for storing water pooled in the storage section 72b. The water recovery container 73 is provided outside the exhaust air line 34 or the exhaust fuel line 43 at a position lower than the storage section 72b.

The water recovery line 74 carries water pooled in the storage section 72b to the water recovery container 73, and connects the storage section 72b and the water recovery container 73.

The stored level detector 75 is provided in the storage section 72b, and detects the level of water pooled in the storage section 72b. The stored level detected by the stored level detector 75 is inputted to the control device 62.

The water recovery on/off valve 76 is provided in the water recovery line 74, and opens and closes the water recovery line 74. The control device 62 controls the opening and closing of the water recovery on/off valve 76.

In the water recovery device 71, if the level of water pooled in the storage section 72b and detected by the stored level detector 75 exceeds a predetermined maximum level, the control device 62 opens the water recovery on/off valve 76. The water in the storage section 72b is then carried to the water recovery container 73 via the water recovery line 74. When the level of water in the storage section 72b decreases and the level detected by the stored level detector 75 falls under a minimum amount (or the water drains away completely), the control device 62 closes the water recovery on/off valve 76.

In the water recovery device 71, the space above the water in the water recovery container 73 is connected to combustion equipment 78 via a gas exhaust line 77. When exhaust fuel gas L3 from the exhaust fuel line 43 is carried to the water recovery container 73 along with water, the exhaust fuel gas L3 is carried to the combustion equipment 78 via the gas exhaust line 77 and combusted.

The water recovery device 71 is connected to the coolant storage unit 63 via a water supply device (water supply unit) 81. The water supply device 81 comprises a water supply line 82 connecting the water recovery container 73 and the coolant storage unit 63. A water supply on/off valve 83 and a water supply compressor 84 are provided in the water supply line 82. The water supply on/off valve 83 opens and closes the water supply line 82. The control device 62 controls the opening and closing of the water supply on/off valve 83. The water supply compressor 84 carries water from the water recovery container 73 to the water supply line 82. The control device 62 controls the driving of the water supply compressor 84. The coolant storage unit 63 is provided with a stored level detector 85 for detecting the level of stored water. The stored level detected by the stored level detector 85 is inputted into the control device 62.

A minimum level for the level of water stored in the coolant storage unit 63 is pre-stored in the control device 62. When the stored level detected by the stored level detector 85 falls below the minimum level, the control device 62 activates the water supply device 81.

Specifically, as shown in FIG. 6, when, for example, water is supplied as coolant C from the coolant storage unit 63 to the interior of the exhaust air line 34 or the exhaust fuel line 43, the amount of water stored in the coolant storage unit 63 decreases, and the stored level detected by the stored level detector 85 falls below the minimum level (step S21: Yes), the control device 62 opens the water supply on/off valve 83 and drives the water supply compressor 84 (step S22). The water in the water recovery container 73 of the water recovery device 71 is then carried to the coolant storage unit 63 via the water supply line 82. If the stored level detected by the stored level detector 85 has not fallen below the minimum level (step S21: No), the control device 62 re-inputs and monitors the stored level detected by the stored level detector 85.

When the stored level increases and the stored level detector 85 detects that the coolant storage unit 63 is full as the result of the water supply on/off valve 83 being opened and the water supply compressor 84 being driven (step S23: Yes), the control device 62 closes the water supply on/off valve 83 and stops the water supply compressor 84 (step S24), ends the control process, returns to step S21, and re-inputs and monitors the stored level detected by the stored level detector 85. If the stored level does not increase (step S23: No), the control device 62 returns to step S2 and continues to open the water supply on/off valve 83 and drive the water supply compressor 84.

As described above, the power generation system 10 of the embodiment is provided with a water recovery device 71 for extracting and recovering water precipitating within the system, water recovered by the water recovery device 71 being stored in the coolant storage unit 63 as coolant C.

As a result, water precipitating within the system is extracted and stored in the coolant storage unit 63, allowing effective use to be made of water precipitating within the system as coolant C.

The power generation system 10 of the embodiment is provided with a water recovery device 71 for extracting and recovering water precipitating within the system, a water supply line 82 connecting the water recovery device 71 and the coolant storage unit 63, a water supply on/off valve 83 provided in the water supply line 82, a water supply compressor 84, provided in the water supply line 82, for carrying water from the water recovery device 71 to the coolant storage unit 63, and a stored level detector 85 for detecting the level of water stored within the coolant storage unit 63, and, when the level of stored water detected by the stored level detector 85 falls below a minimum level, the control device 62 opens the water supply on/off valve 83 and drives the water supply compressor 84.

As a result, when the level of water stored in the coolant storage unit 63 decreases, water is supplied to the coolant storage unit 63 from the water recovery device 71 for extracting and recovering water precipitating within the system. Water precipitating within the system can thus be used to cool the exhaust air A3 or the exhaust fuel gas L3. Moreover, the water can be replenished when the level of water stored in the coolant storage unit 63 decreases. As a result, shortages of cooling water can be eliminated, and the temperature of the exhaust air A3 or the exhaust fuel gas L3 can be reliably decreased.

Apart from being used as coolant C, water recovered by the water recovery device 71 and stored in the storage section 72*b* can be used as coolant for the combustor 22 of the turbine 11 of the power generation system 10.

In the power generation system 10 of the embodiment, as illustrated in FIG. 1, the exhaust air line 34 and the exhaust fuel line 43 constituting the exhaust lines are provided with a pressure detector 68 (68*a*) and a pressure detector 68 (68*b*), respectively. These pressure detectors 68 detect the pressure of the exhaust air line 34 and the exhaust fuel line 43. The pressure detected by the pressure detectors 68 is inputted to the control device 62.

The control device 62 controls the coolant compressors 66 on the basis of the pressure detected by the pressure detectors 68.

Specifically, as illustrated in FIG. 8, when the coolant compressors are driven in step S2 in the control process shown in FIG. 4, the line pressure (pressure of the exhaust air line 34 and exhaust fuel line 43) detected by the pressure detectors 68 exceeds the pressure at which the coolant compressors 66 carry coolant (step S31), the control device 62 controls the coolant compressors 66 by, for example, increasing the rpm of the coolant compressors 66, thereby increase the pressure at which coolant C is carried (step S32). If the pressure detected by the pressure detectors 68 does not exceed the pressure at which the coolant compressors 66 carries coolant (step S31: No), the control device 62 re-inputs and monitors the pressure detected by the pressure detectors 68.

When the line pressure detected by the pressure detectors 68 falls below the pressure at which the coolant compressors 66 carry coolant as the result of the coolant compressors 66 being controlled and the pressure at which the coolant C is carried being increased (step S33: Yes), the control device 62 ends the control process, returns to step S31, and re-inputs and monitors the pressure detected by the pressure detectors 68. If the line pressure detected by the pressure detectors 68 has not fallen below the pressure at which the coolant compressors 66 carry coolant (step S33: No), the control device 62 returns to step S32, controls the coolant compressors 66, and increases the pressure at which the coolant C is carried.

As described above, the power generation system 10 of the embodiment is provided with pressure detectors 68 for detecting the pressure of the exhaust air line 34 and the exhaust fuel line 43, and the control device 62 controls the coolant compressors 66 on the basis of the pressure detected by the pressure detectors 68 so that the pressure at which the coolant compressors 66 carry coolant C is greater than the pressure in the exhaust air line 34 and the exhaust fuel line 43.

Thus, when, for example, pressure increases due to an increase in the temperature of the exhaust air A3 discharged from the SOFC 13 or pressure increases due to an increase in the temperature of the exhaust fuel gas L3 discharged from the SOFC 13, the pressure detectors 68 detect this pressure, and the pressure at which the coolant compressors 66 carry coolant C is increased. Coolant C can thus be reliably carried to the exhaust air line 34 and the exhaust fuel line 43, and the temperature of the exhaust air A3 and the exhaust fuel gas L3 can be reliably reduced.

In the power generation system 10 of the embodiment, as described above, the exhaust line is an exhaust air line 34 for carrying exhaust air A3 discharged from the SOFC 13.

It is thus possible, when the temperature of the exhaust air A3 discharged from the SOFC 13 exceeds temperature during rated operation, to cool the exhaust air A3 and reduce the temperature of the exhaust air A3. As a result, it is possible to prevent high-temperature-induced failure of the exhaust air line 34 for carrying exhaust air A3. It is also possible to foresee the projected temperature needed for the design of the exhaust air line 34, and to set this projected temperature to a temperature near that of the SOFC 13 during rated operation, allowing for a design that is safe and avoids increased manufacturing costs.

In the power generation system 10 of the embodiment, as described above, the exhaust line is an exhaust fuel line 43 for carrying exhaust fuel gas L3 discharged from the SOFC 13.

It is thus possible, when the temperature of the exhaust fuel gas L3 discharged from the SOFC 13 exceeds temperature during rated operation, to cool the exhaust fuel gas L3 and reduce the temperature of the exhaust fuel line 43. As a result, it is possible to prevent high-temperature-induced failure of the exhaust fuel line 43 for carrying the exhaust fuel gas L3. It is also possible to foresee the projected temperature needed for the design of the exhaust fuel line 43, and to set this projected temperature to a temperature near that of the SOFC 13 during rated operation, allowing for a design that is safe and avoids increased manufacturing costs.

REFERENCE SIGNS LIST

10 Power generation system
13 SOFC (solid oxide fuel cell: fuel cell)
34 Exhaust air line (exhaust line)
43 Exhaust fuel line (exhaust line)
61 Exhaust cooling device (exhaust cooling unit)
62 Control device (control unit)
63 Coolant storage unit
64 Coolant supply line
65 Coolant on/off valve
66 Coolant compressor
67 Temperature detector 68 Pressure detector
71 Water recovery device (water recovery unit)
81 Water supply device (water supply unit)
82 Water supply line
83 Water supply on/off valve
84 Water supply compressor
85 Stored level detector

The invention claimed is:

1. A power generation system, comprising:
a fuel cell;
an exhaust line for carrying exhaust discharged from the fuel cell;
a combustor connected to the exhaust line and configured to mix and combust the exhaust of the fuel cell supplied from the exhaust line and a fuel gas;
a temperature detector for detecting a temperature of the exhaust discharged from the fuel cell or a temperature of the exhaust line;
an exhaust cooling unit for cooling exhaust in the exhaust line by carrying coolant to the exhaust line at an upstream side of a connection point with the combustor;
a control unit in which a predetermined temperature exceeding the temperature of the exhaust at a rated operation of the fuel cell is pre-stored; and
a coolant recovery unit which is connected with the exhaust line at the upstream side of the connection point with the combustor, for extracting and recovering the coolant in the exhaust line precipitated at the upstream side of the connection point with the combustor,
wherein the control unit controls to activate the exhaust cooling unit when the temperature detected by the temperature detector exceeds the predetermined temperature, and controls to deactivate the exhaust cooling unit when the temperature detected by the temperature detector falls below the predetermined temperature.

2. The power generation system according to claim 1, wherein the exhaust cooling unit includes:
a coolant storage unit for storing coolant;
a coolant supply line connecting the exhaust line and the coolant storage unit;
a coolant on/off valve provided in the coolant supply line; and
a coolant compressor, provided in the coolant supply line, for carrying coolant from the coolant storage unit to the exhaust line,
and
the control unit controls to open the coolant on/off valve and drives the coolant compressor when the temperature detected by the temperature detector exceeds the predetermined temperature, and controls to close the coolant on/off valve and to stop the coolant compressor when the temperature detected by the temperature detector falls below the predetermined temperature.

3. The power generation system according to claim 2, wherein water is stored in the coolant storage unit as coolant.

4. The power generation system according to claim 2, further comprising a water recovery unit for extracting and recovering water precipitating within the system, water recovered by the water recovery unit being stored in the coolant storage unit as coolant.

5. The power generation system according to claim 2, further comprising a pressure detector for detecting a pressure of the exhaust line,
the control unit controlling the coolant compressor on the basis of the pressure detected by the pressure detector so that a pressure at which the coolant compressor carries coolant is greater than the pressure of the exhaust line.

6. The power generation system according to claim 1, wherein the exhaust line is an exhaust air line for carrying exhaust air discharged from the fuel cell.

7. The power generation system according to claim 1, wherein the exhaust line is an exhaust fuel line for carrying exhaust fuel gas discharged from the fuel cell.

8. A method of cooling fuel cell exhaust in a power generation system, comprising the steps of:
carrying exhaust discharged from a fuel cell via an exhaust line,
mixing and combusting the exhaust of the fuel cell supplied from the exhaust line and a fuel gas,
detecting a temperature of the exhaust discharged from the fuel cell or a temperature of the exhaust line,
pre-storing a predetermined temperature exceeding the temperature of the exhaust at a rated operation of the fuel cell,
cooling the exhaust in the exhaust line when the temperature of the exhaust discharged from the fuel cell exceeds the predetermined temperature by carrying coolant to the exhaust line at an upstream side of a connection point with a combustor,
extracting and recovering the coolant in the exhaust line precipitated at the upstream side of the connection point with the combustor, and
stopping the cooling of the exhaust in the exhaust line when the temperature of the exhaust discharged from the fuel cell falls below the predetermined temperature.

9. The power generation system according to claim 1, wherein
the coolant recovery unit includes
a coolant recovery container configured to store the coolant, and
combustion equipment, wherein
when the exhaust discharged from the fuel cell is carried to the coolant recovery container together with the coolant, the combustion equipment is configured to combust the exhaust carried to the coolant recovery container.

* * * * *